United States Patent
Trantham et al.

(10) Patent No.: US 9,305,596 B2
(45) Date of Patent: Apr. 5, 2016

(54) MULTI-SENSOR MEDIA DEFECT SCAN

(71) Applicant: Seagate Technology LLC, Cupertino, CA (US)

(72) Inventors: Jon David Trantham, Chanhassen, MN (US); William M. Radich, Longmont, CO (US); Jason Gadbois, Shakopee, MN (US); Barmeshwar Vikramaditya, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 79 days.

(21) Appl. No.: 14/228,749

(22) Filed: Mar. 28, 2014

(65) Prior Publication Data

US 2015/0279419 A1 Oct. 1, 2015

(51) Int. Cl.
*G11B 27/36* (2006.01)
*G11B 20/18* (2006.01)
*G11B 5/00* (2006.01)
*G11B 5/09* (2006.01)
*G11B 5/60* (2006.01)

(52) U.S. Cl.
CPC .......... *G11B 20/182* (2013.01); *G11B 20/1816* (2013.01); *G11B 20/1889* (2013.01); *G11B 5/09* (2013.01); *G11B 5/607* (2013.01); *G11B 2005/0021* (2013.01); *G11B 2020/1826* (2013.01)

(58) Field of Classification Search
None
See application file for complete search history.

(56) References Cited

U.S. PATENT DOCUMENTS

| | | | |
|---|---|---|---|
| 4,523,243 A | 6/1985 | Billington | |
| 6,081,402 A | 6/2000 | Cho | |
| 6,104,562 A | 8/2000 | Ottesen et al. | |
| 6,606,211 B1 | 8/2003 | Lim et al. | |
| 6,807,034 B2 | 10/2004 | Hasegawa et al. | |
| 6,826,140 B2 | 11/2004 | Brommer et al. | |
| 6,897,532 B1 | 5/2005 | Schwarz et al. | |
| 7,012,786 B2 | 3/2006 | Nakamikawa | |
| 7,126,890 B2 | 10/2006 | Learned et al. | |
| 7,508,619 B2 | 3/2009 | Okamoto et al. | |
| 7,564,656 B2 | 7/2009 | Gurney et al. | |
| 7,567,397 B2 | 7/2009 | Lu | |
| 7,636,219 B2 | 12/2009 | Ikegami et al. | |
| 7,760,465 B2 | 7/2010 | Koeppe | |
| 7,813,066 B2 | 10/2010 | Nakagawa et al. | |
| 8,014,562 B2 | 9/2011 | Rhoads et al. | |
| 8,483,027 B1 * | 7/2013 | Mak | G11B 5/5547 369/53.31 |
| 8,508,880 B2 | 8/2013 | Gao et al. | |
| 8,558,331 B2 | 10/2013 | Zhu et al. | |
| 8,773,957 B1 * | 7/2014 | Champion | G11B 20/182 369/13.02 |
| 8,879,186 B1 * | 11/2014 | Xia | G11B 20/182 360/31 |
| 8,891,192 B1 * | 11/2014 | Dang | G11B 5/59627 360/234 |
| 8,964,320 B1 * | 2/2015 | Hu | G11B 19/048 360/25 |
| 9,123,356 B2 * | 9/2015 | Sankaranarayanan | G11B 5/09 |
| 2002/0131213 A1 | 9/2002 | Tsuchiya | |
| 2004/0080872 A1 | 4/2004 | Sato et al. | |

(Continued)

*Primary Examiner* — Regina N Holder
(74) *Attorney, Agent, or Firm* — Hall Estill Attorneys at Law (57) ABSTRACT

Apparatus and method for detecting media defects using a multi-sensor transducer. In some embodiments, a first pattern is written to a first track on a rotatable storage media and a second pattern is written to a second track on the media. A first read sensor of a multi-sensor transducer senses the first pattern from the first track and a second read sensor of the multi-sensor transducer concurrently senses the second pattern from the second track. At least one storage media defect is detected responsive to the sensed first and second patterns.

20 Claims, 6 Drawing Sheets

(56) References Cited

U.S. PATENT DOCUMENTS

| | | |
|---|---|---|
| 2005/0036437 A1 | 2/2005 | Learned et al. |
| 2007/0019335 A1 | 1/2007 | McFadyen |
| 2008/0144228 A1 | 6/2008 | Funayama |
| 2009/0316309 A1 | 12/2009 | Partee et al. |
| 2011/0069413 A1 | 3/2011 | Maat et al. |
| 2013/0082339 A1 | 4/2013 | Aggarwal et al. |
| 2013/0155826 A1 | 6/2013 | Zhang et al. |
| 2013/0286502 A1 | 10/2013 | Erden et al. |

\* cited by examiner

MULTI-SENSOR MEDIA DEFECT SCAN

SUMMARY

Various embodiments of the present disclosure are generally directed to an apparatus and method for detecting media defects using a multi-sensor transducer.

In some embodiments, a first pattern is written to a first track on a rotatable storage media and a second pattern is written to a second track on the media. A first read sensor of a multi-sensor transducer senses the first pattern from the first track and a second read sensor of the multi-sensor transducer concurrently senses the second pattern from the second track. At least one storage media defect is detected responsive to the sensed first and second patterns.

In other embodiments, a multi-sensor transducer is provided adjacent a rotatable storage media, the multi-sensor transducer having at least one write element and a plurality of read sensors. The at least one write element is used to write a first pattern to a first track on the media and a second pattern to a second track on the media. A first read sensor of the plurality of read sensors senses the first pattern from the first track while a second read sensor of the plurality of read sensors concurrently senses the second pattern from the second track. At least one storage media defect is identified responsive to the sensed first and second patterns.

In still other embodiments, a multi-sensor transducer is supported adjacent a rotatable storage media. The transducer has at least one write element and at least first and second read sensors. A media defect manager identifies defects on the media by directing the at least one write element to write a first pattern to a first track on the media and a second pattern to a second track on the media. The media defect manager subsequently directs the first and second read sensors to concurrently sense the respective first and second patterns.

DETAILED DESCRIPTION

Data storage devices store and retrieve data in a fast and efficient manner. Some data storage devices such as hard disc drives (HDDs) store data in the form of tracks on one or more rotatable data storage media. Data read/write transducers (heads) are mechanically supported adjacent recording surfaces of the media by fluidic currents established by high speed rotation of the surfaces. A write element in the transducer writes data to the tracks, and a read sensor (read element or reader) in the transducer can be subsequently positioned adjacent the tracks to read back the previously stored data.

A continuing trend in the data storage industry is to provide storage devices with ever higher data storage capacities and data densities. Some recent product designs have proposed the use of multiple read sensors (readers) in a transducer reader section. The use of multiple sensors allows the concurrent recovery of data from multiple adjacent data tracks using two dimensional magnetic recording (TDMR). Multiple sensors can also be used to generate separate readback signals from the same data track during so-called multi-sensor magnetic reading (MSMR) operations.

Various embodiments of the present disclosure are generally directed to improvements in the manner in which sensors are used in a multi-sensor data recording environment to scan for media defects. It is contemplated that such processing will occur during device manufacturing, although the various embodiments can also be implemented at other suitable times during device operation.

As explained below, in some embodiments a first pattern is written to a first track on a storage media and a second pattern is written to a second track on the storage media. At least first and second read sensors of a multi-sensor transducer concurrently sense the first and second patterns. At least one media defect is detected responsive to the sensed first and second patterns.

The first and second patterns are written using a write element of the multi-sensor transducer. In some embodiments, the write element writes the respective first and second patterns as repeating patterns during successive rotations of the media. The first and second repeating patterns may take the form of an oscillating (e.g., 2T repeating) pattern, may take the form of a repeating encoded pattern, may take the form of formatted user data, or more generally may take any form suitable for the detection of defects in the recorded media. The first and second patterns may be written at the same frequency, or at different respective frequencies.

In other embodiments, the write element is positioned between the first and second tracks so that the first and second patterns form a single pattern that extends across at least a portion of both tracks. In this way, the patterns may be written during a single rotation of the media. Parametric adjustments can be applied during the scanning process including increases in writer power during the write operation and/or increases in fly height during the read operation. The increases in writer power can include increases in write current applied to the write element and/or increases in energy (e.g., laser power) applied to a heat assisted magnetic recording (HAMR) module adjacent the write element.

In still further embodiments, more than two read sensors can be used to detect the respective repeating patterns. The read sensors can be staggered, partially overlap, and/or be offset with respect to the tracks and the write element.

Defects are detected from variations in the output readback signals generated by the read sensors. A media defect manager can generate a defect map to identify locations (e.g., sectors) on the media determined to be defective so that user data sectors are not stored in such locations.

Figure 1:
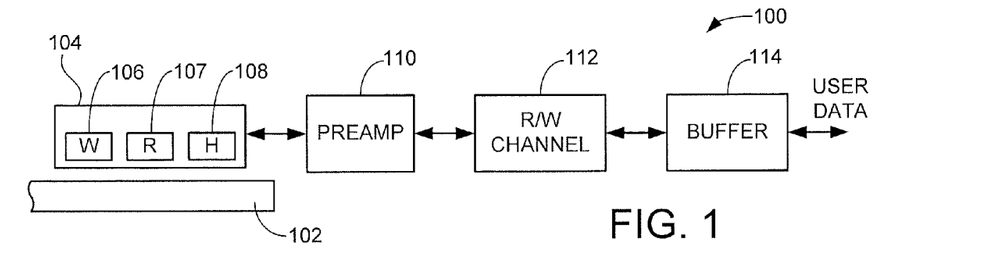
FIG. 1 is a functional block diagram of a data storage device constructed and operated in accordance with various embodiments of the present disclosure.

FIG. 1 provides aspects of an exemplary data storage device 100 in accordance with some embodiments. The device 100 includes a rotatable data recording media (disc) 102 and a data transducer 104. The transducer 104 is radially advanced across the media 102 to access data tracks defined on a recording surface of the media.

The transducer 104 includes a writer section (W) 106 to write data to the media and a reader section (R) 107 to read back data from the media. A fly height adjustment mechanism (heater, or H) 108 can be used to provide adaptive fly height adjustments to the transducer 104 by changing the clearance distance between the transducer 104 and the media 102 during device operation.

FIG. 1 further shows the device 100 to include a preamplifier/driver (preamp) circuit 110, a read/write (R/W) channel 112 and a buffer memory 114. During a write operation, write data supplied by a host are temporarily stored in the buffer 114, conditioned by the R/W channel 112 and streamed to the preamp 110 which applies time-varying write currents to the writer section 106. The writer section includes one or more write elements that selectively magnetize the associated tracks to write the data thereto.

During a subsequent read operation, the reader section 107 recovers one or more readback signals from the media 102. The preamp 110 preamplifies the readback signals, and the R/W channel applies signal processing and decoding techniques to recover the originally stored data which are temporarily stored in the buffer 114 pending transfer to the host.

Figure 2:
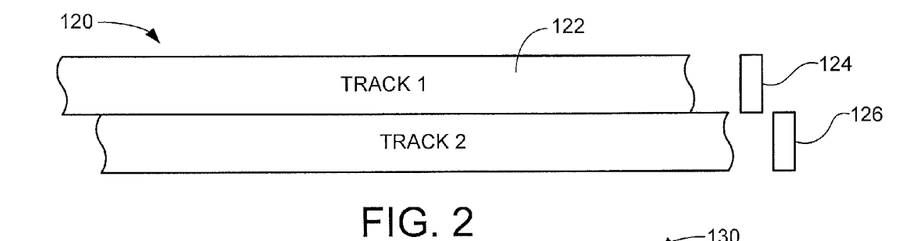
FIG. 2 depicts two dimensional (2D) recording and recovery using the device of FIG. 1 in some embodiments.

FIG. 2 illustrates portions of a rotatable storage media 120 suitable for use in the device 100 of FIG. 1. The storage media 120 has a recording surface on which a number of tracks 122 are defined. Two such tracks are identified as Track 1 and Track 2. Associated read sensors (readers) 124, 126 are provided within a reader section to concurrently read data stored to the respective tracks 122. It will be noted that the sizes of the sensors 124, 126 can vary relative to the widths of the tracks 122, so that the sensors can be wider or narrower than the tracks as required. The relative positions and alignment angles of the sensors can also vary based on a number of factors including presentation skew angle.

In a two dimensional magnetic recording (TDMR) environment, the data from the respective tracks are concurrently transduced by the sensors 124, 126 to provide a pair of readback signals that are processed by a read channel (e.g., 112, FIG. 1) to recover the data stored to the tracks 122. The read sensors 124, 126 are shown non-overlapping in a cross-track direction (e.g., in the width direction across the tracks), but such is merely exemplary and is not limiting.

The tracks 122 in FIG. 2 are shown to immediately abut, thereby suggesting that the respective magnetic patterns written to these tracks may extend all the way to the edges thereof. In practice, a small erasure zone may exist between adjacent tracks where fringing fields of the writer combine to provide a relatively narrow "erased" area. Such erasure zones are not depicted herein but will be understood to be present in at least some cases. Additionally, it is common in some drive products to write the tracks in a specific order (e.g., in a shingled fashion). In a shingled drive only the erase band from the overlapping track remains. Also, depending upon the spacing of the reader sensors and depending upon their positions relative to the written tracks it is possible that the tracks being simultaneously scanned may not abut, but are instead separated by other tracks inbetween.

Figure 3:
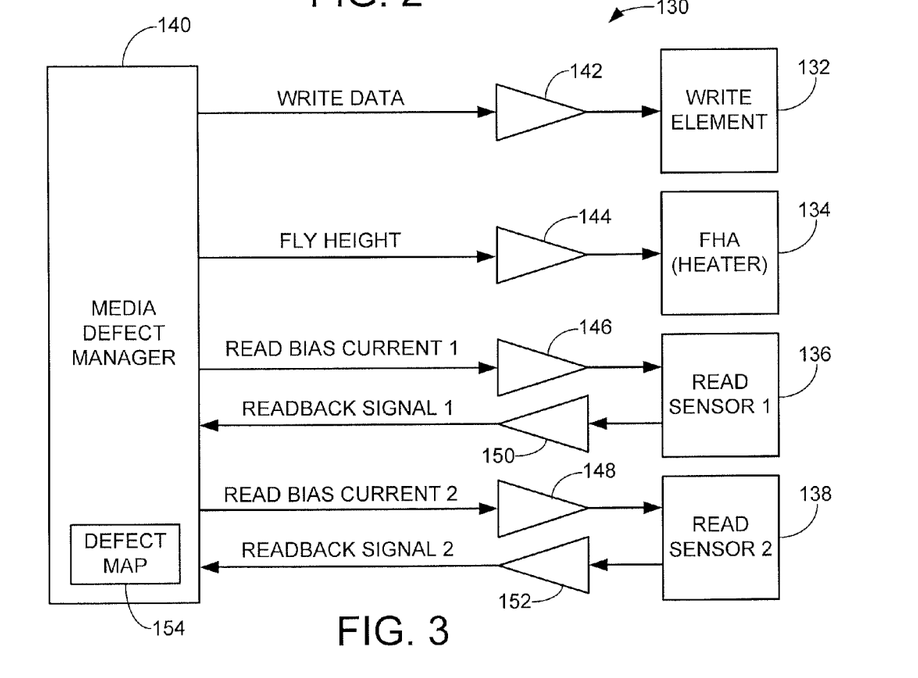
FIG. 3 is a schematic depiction of the transducer of FIG. 1 in accordance with a media defect manager in accordance with some embodiments.

FIG. 3 is a schematic representation of aspects of a data storage device 130 similar to the device 100 of FIG. 1. The device 130 includes a transducer having at least one write element 132, at least one fly height adjustment (FHA) mechanism (heater) 134, and at least two read sensors 136 and 138 (designated "read sensor 1" and "read sensor 2"). In some designs, at least three read sensors may be incorporated into the transducer to account for different skew angles, but only two of the three (or more) sensors are normally active at any given time.

A media defect manager 140 forms a portion of the storage device 130. The defect manager 140 may incorporate hardware and/or software (e.g., firmware) elements executed by a programmable storage device controller. As explained below, the media defect manager 140 operates to detect media defects in an adjacent storage media (not shown in FIG. 3) during a media defect scan sequence.

Write data in the form of a repeating pattern are supplied by the media defect manager 140 to a write driver 142, which provides time-varying write currents to the write element 132. The write element may include a main pole with an associated coil to direct magnetic flux to the storage media.

In the context of a perpendicular magnetic recording environment, the write element 132 may include a return pole coupled to the main pole to provide a return path for the applied magnetic flux. Other elements may also be incorporated into the write element 132, such as a heat assisted magnetic recording (HAMR) module with a heating element, such as a laser diode or other electromagnetic radiation emitter and a near field transducer (NFT), that provides localized heating of the media during data writing.

As required, the media defect manager 140 provides fly height adjustment commands to an FHA driver 144 to adjust the fly (clearance) height of the transducer. In some embodiments, the heater 134 is a resistive element that generates heat responsive to power supplied thereto by the FHA driver 144. Thermal expansion of the resistive element and/or of the surrounding transducer support structure (e.g., slider) will bring the respective active elements (writer and readers) closer to the media surface.

While not limiting, it is contemplated that the first and second read sensors 136, 138 will each take a giant magneto resistive (GMR) construction and will transduce the magnetic patterns written by the write element 132 responsive to a changes in the electrical resistance of the elements (so called "MR" response). The respective read sensors 136, 138 may be nominally identical, or may have different constructions and readback characteristics, including different sensitivities to defect events.

Relatively small read bias currents pass through the respective read sensors 136, 138 through the application of read bias current commands to current drivers 146, 148. Preamplifier/driver circuits 150, 152 apply signal preconditioning, including amplification, of the resulting readback signals from the sensors.

As explained below, during a media defect scan sequence the various elements shown in FIG. 3 will be activated in order, and media defects will be detected by the media defect manager 140 based on the readback signals output by the preamplifier/drivers 150, 152.

The media defect manager 140 will use this information in combination with other control information from the system, such as from a servo control system (not separately denoted) to identify the physical locations of defects. These locations will be updated in a defect map structure 154 stored in a suitable local memory of the system, and thereafter used during device formatting and other operations to avoid using these identified defective regions for data storage.

Figure 4A:
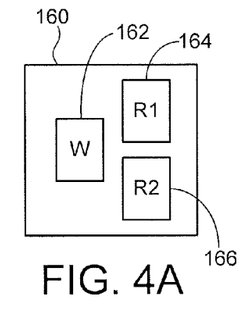
FIGS. 4A-4C show different exemplary constructions for the sensors in FIG. 3.

The relative arrangement of the write element 132, the heater 134, and the respective read sensors 136, 138 within the transducer can vary depending on the requirements of a given application. FIG. 4A is a schematic representation of an exemplary transducer 160 with write element (W) 162 nominally centered with respect to respective read sensors (R1 and R2) 164, 166. The read sensors 164, 166 are non-overlapping and are nominally aligned in the down-track direction.

Figure 4B:
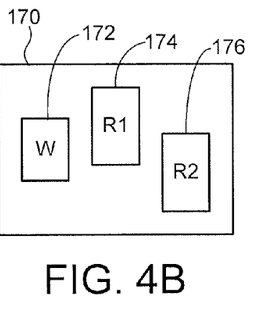
Figure 4C:
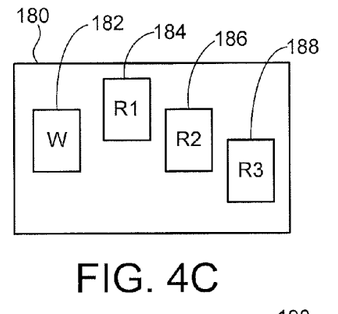

FIG. 4B shows another exemplary transducer 170 with write element (W) 172 and read sensors (R1 and R2) 174, 176. The sensors 174, 176 are overlapping and offset in the down-track direction. FIG. 4C shows yet another exemplary transducer 180 with write element (W) 182 and three read sensors (R1, R2 and R3) 184, 186 and 188. The read sensors 184, 186 and 188 are overlapping and offset in the down-track direction.

These and other multi-sensor transducer arrangements can readily be used in accordance with the present discussion. While transducers having more than two read sensors are often configured to only selectively operate two of the sensors at a time (e.g., the two best arranged at a given skew angle to provide greatest radial separation), in some embodiments, the output signals from all available sensors are used during defect scanning.

Figure 5:
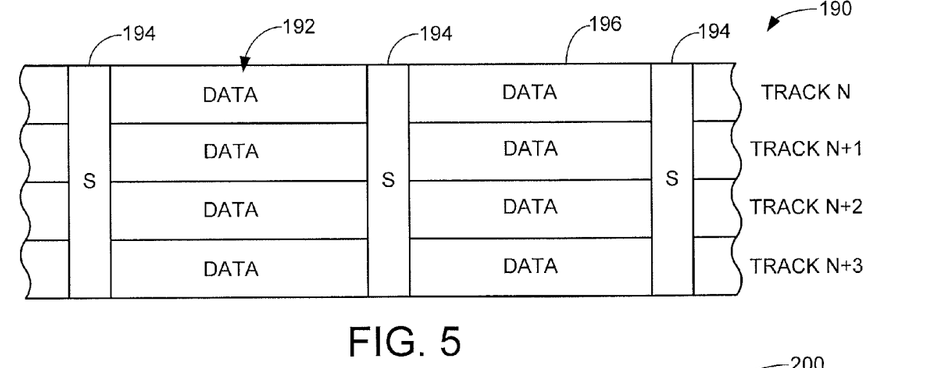
FIG. 5 depicts an exemplary format for a number of adjacent data tracks on a rotatable recording media such as in FIG. 1.

FIG. 5 depicts another storage media 190 on which a number of adjacent data tracks 192 are defined. For reference, the tracks are designated as tracks N through N+3. The tracks are concentric and extend about a center of rotation for the storage media 190. Tracks such as 192 may be defined on the media 190 substantially from the outermost diameter (OD) to the innermost diameter (ID) of the available storage media recording surface.

A plurality of spaced apart servo fields (S) are represented at 194. The servo fields 194 provide head position information for the device servo control system. The format of the servo fields can vary depending on the requirements of a given application, but an exemplary format may include a synchronization (sync) field, an automatic gain control (AGC) field, an index (angular position) field, a track address (radial position) field, and an offset dibit burst pattern (e.g., ABCD bursts) to provide intra-track positioning information.

The servo fields 194 extend about the media much like spokes on a wheel. The individual tracks 192 are defined in relation to the servo fields 194. User data are generally stored in fixed sized sectors along the tracks 192 in data regions 196 between adjacent pairs of the servo fields 194.

Figure 6:
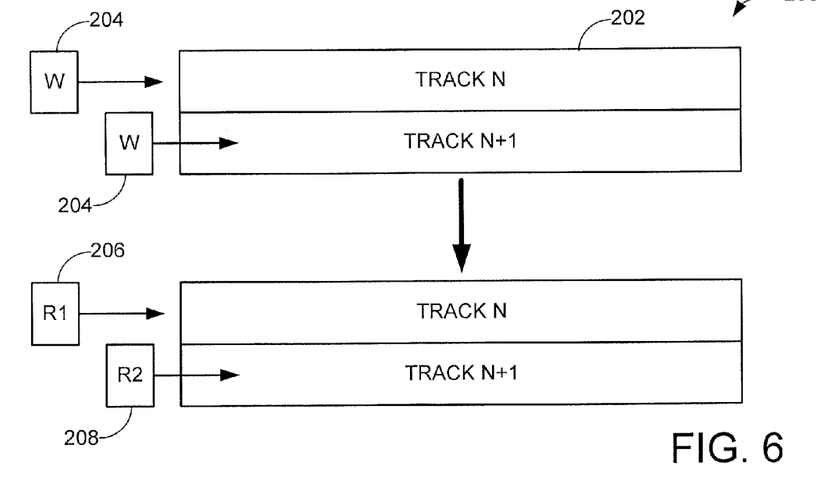
FIG. 6 shows a media defect scan sequence in which repeating patterns are written to individual tracks.

FIG. 6 schematically represents a media defect scanning sequence carried out upon a storage media 200 similar to the media discussed above. The storage media 200 includes servo data (not shown) to define the radial locations of various tracks 202, including two such tracks denoted as track N and track N+1.

During the media defect scanning sequence of FIG. 6, a write element (W) 204 successively writes a selected repeating pattern to the data regions (196, FIG. 5) along the tracks 202. A first repeating pattern is written to the first track N during a first revolution of the media 200, followed by the writing of a second repeating pattern to the second track N+1 during a subsequent, second revolution of the media 200. In each case, servo data (e.g., fields 194, FIG. 5) are used to nominally align the write element 204 with the respective tracks N and N+1. In some embodiments, the first and second repeating patterns are oscillating patterns such as 2T patterns each at a selected frequency. The selected frequency and phase offsets of the patterns may be the same for both tracks, or may be different.

Continuing with FIG. 6, first and second read sensors (R1 and R2) 206, 208 are positioned as shown and used to concurrently read back the first and second repeating patterns from the respective tracks N and N+1. The readback signals generated by the respective read sensors 206, 208 are used to identify defective locations on the media 200.

Figure 7:
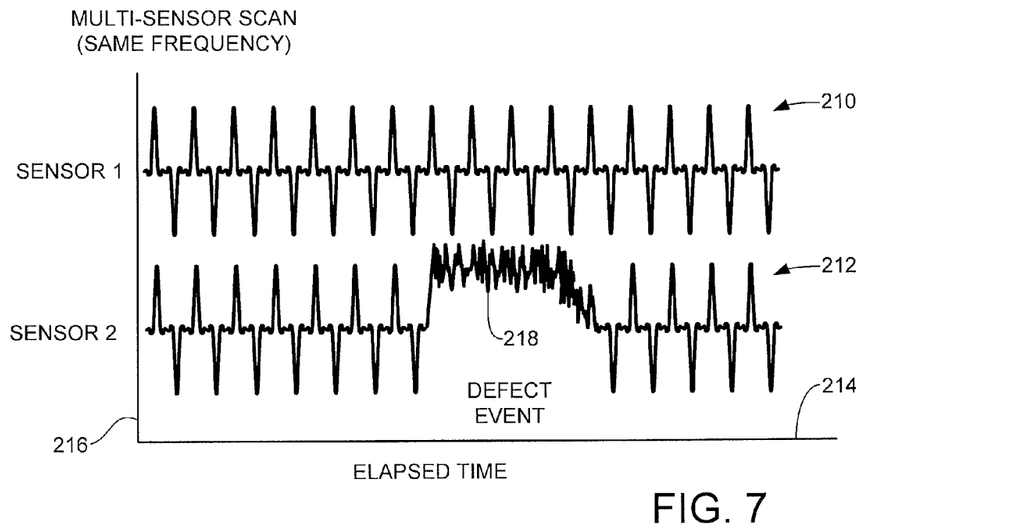
FIG. 7 is a graphical representation of readback signals nominally obtained during the sequence of FIG. 6 in which repeating patterns at the same frequency are written to the tracks.

FIG. 7 is a graphical representation of the sequence from FIG. 6 in accordance with some embodiments. First and second readback signals 210, 212 are respectively transduced by the read sensors 206, 208 ("sensor 1" and "sensor 2"). The signals 210, 212 are plotted against a common elapsed time x-axis 214 and a common signal amplitude y-axis 216.

The repeating patterns written by the write element 204 (FIG. 6) are 2T patterns written at the same nominal frequency to both tracks. In some embodiments, the patterns are phase coherent. Phase coherent patterns can be stitched across a large section (or the entire radial width) of the media 200 as desired. In other cases, the respective patterns, while written at the same nominal frequency, are out of phase one with respect to the other.

A defect event is represented at 218 as a portion of the readback signal 212 from the second read sensor 208 (sensor 2). The actual readback response that arises from a media defect will depend on a variety of factors including the type of defect (e.g., thermal asperity, media dropout, etc.) so FIG. 7 is merely exemplary and is not limiting.

Figure 8:
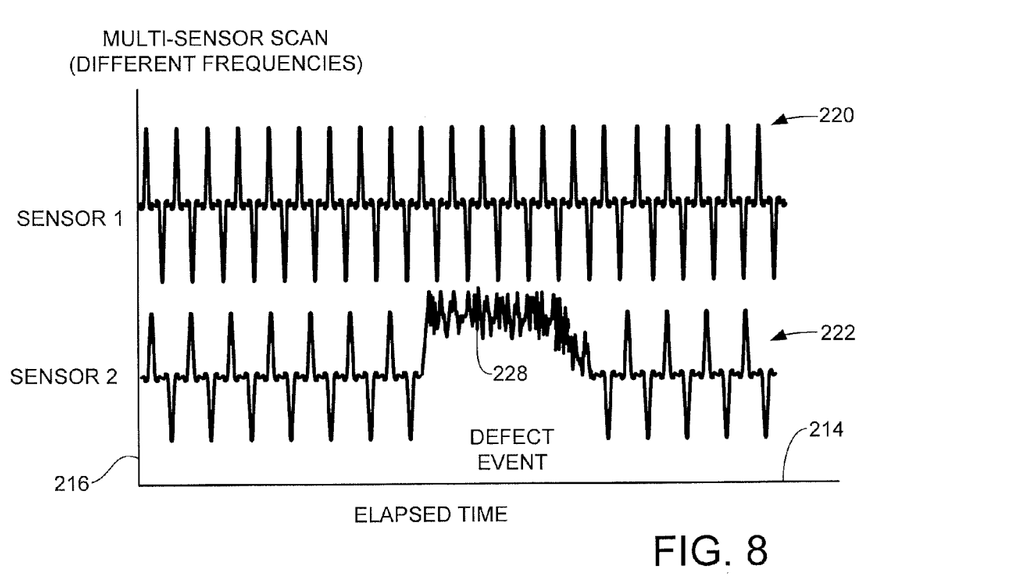
FIG. 8 is a graphical representation of readback signals nominally obtained during the sequence of FIG. 6 in which repeating patterns at different frequencies are written to the tracks.

FIG. 8 is a graphical representation of the sequence of FIG. 6 in accordance with other embodiments. As before, FIG. 8 shows a pair of readback response curves 220, 222 from the respective sensors 206, 208 (sensors 1 and 2). In FIG. 8, the respective first and second repeating patterns are written at different frequencies. While not required, it will be noted that the respective patterns may provide different response levels (e.g., signal to noise responses, SNR) or may vary in other ways. An example defect event is depicted at 228.

Figure 9:
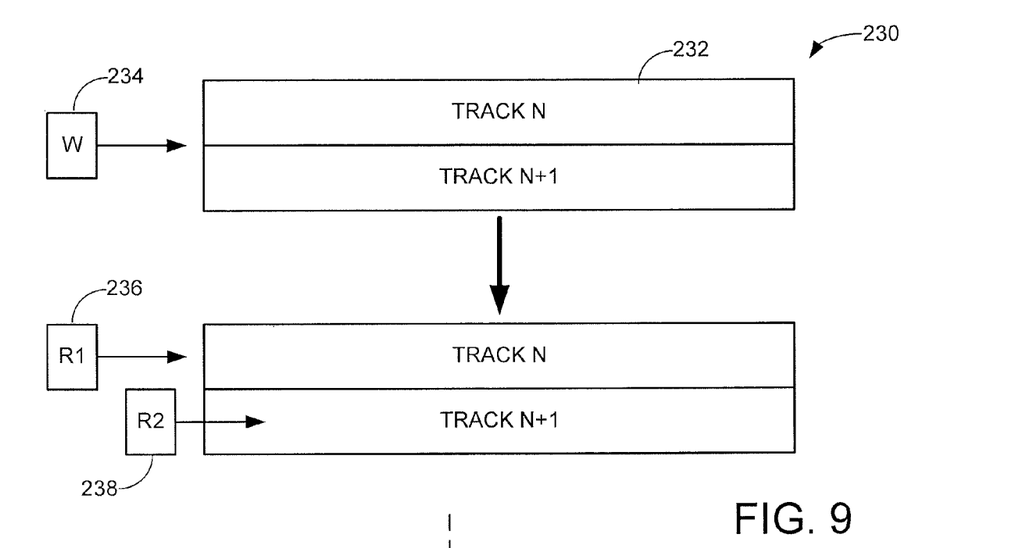
FIG. 9 shows another media defect scan sequence in which a single repeating pattern is written to multiple tracks.

FIG. 9 schematically represents another media defect scanning sequence carried out upon a storage media 230 similar to the media discussed above. The storage media 230 includes servo data (not shown) to define the radial locations of various tracks 232, including two such tracks denoted as track N and track N+1.

Unlike the sequence in FIG. 6, the sequence in FIG. 9 operates to nominally center a write element 234 at a midpoint location between the respective tracks N and N+1. The write element 234 is provided with write currents to write a single pattern that extends across both tracks. First and second read sensors 236, 238 thereafter concurrently sense different sides, or portions of, the written single pattern from the tracks N, N+1.

Figure 10:
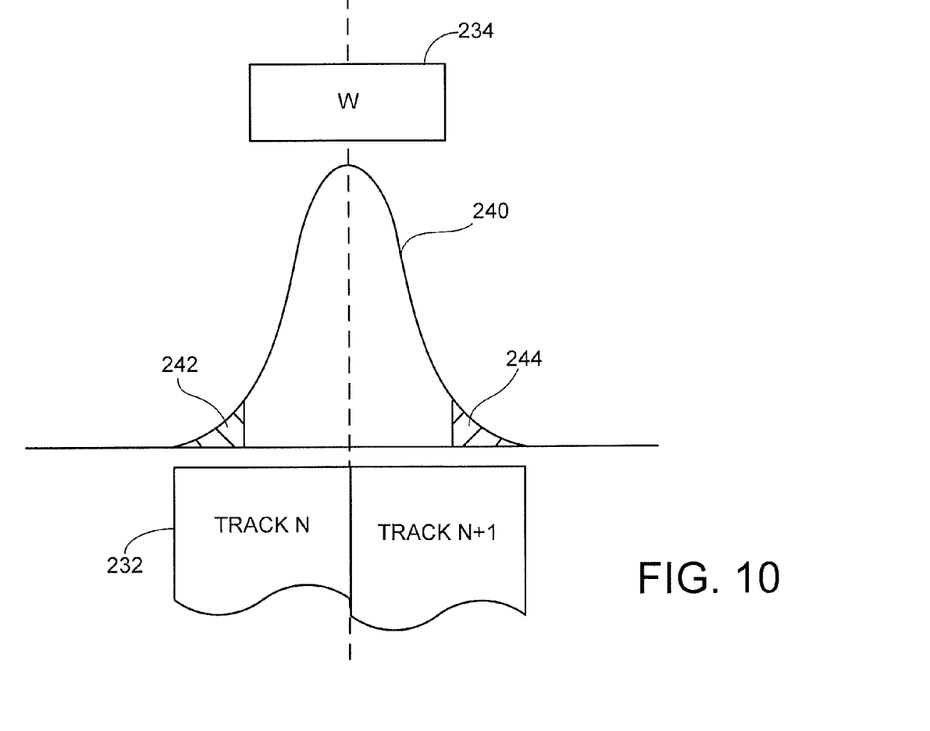
FIG. 10 depicts an exemplary write response of the write element of FIG. 9.

FIG. 10 depicts the write element 234 in conjunction with a magnetic writer response curve 240. The curve 240 generally represents the strength of the write field applied to the associated media 230 during the writing of the single pattern to both tracks. The write field is shown to be nominally Gaussian in shape, but other shapes, including asymmetric shapes, may be achieved. Regardless, it can be seen that the medial portion of the writer will tend to produce the greatest field strength, and the field strength will be reduced near the edges of the write element 234. Fringe fields are denoted at 242, 244 to denote relatively low levels of magnetic recording over portions of the respective tracks N, N+1.

While the single pattern represented by curve 240 does not fully extend across the entire radial extents of the respective tracks N and N+1, the single pattern will tend to extend sufficiently to enable the concurrent scanning of both tracks for defects. For reference, the portion of the single pattern aligned with track N will constitute a "first repeating pattern" read by read sensor 236 and the portion of the single pattern aligned with track N+1 will constitute a "second repeating pattern" read by read sensor 238.

Figure 11:
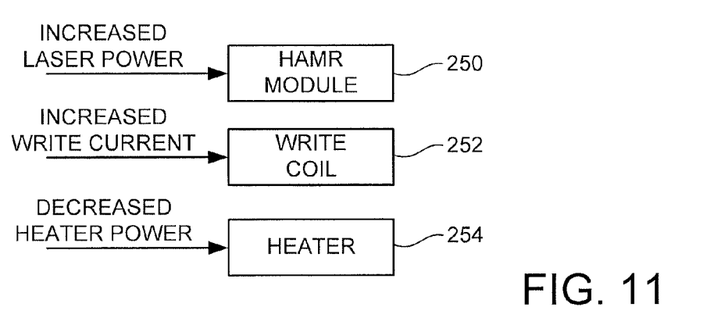
FIG. 11 illustrates parametric adjustments that are singly or applied in combination during the sequence of FIG. 9 in some embodiments.

Parametric adjustments can be carried out during the single pattern scheme of FIG. 8 to enhance the ability of the read sensors 236, 238 to detect defects from the adjacent tracks N, N+1. FIG. 11 depicts a number of such parametric adjustments such as an increased laser (HAMR) power supplied to a HAMR module 250 of the write element 234, and an increased write current being supplied to a write coil 252 of the write element 234. Either or both of these parametric adjustments are associated with increases in writer power, and can be applied during the write phase in an effort to "extend" the effective width of the written pattern across the associated tracks.

Another parametric adjustment that can be made in lieu of, or in addition to, an increase in writer power is an increase in fly height. A decreased heater power can be supplied to a heater 254 during the read operation to increase the clearance distance, and hence the effective range, of the readers.

Figure 12:
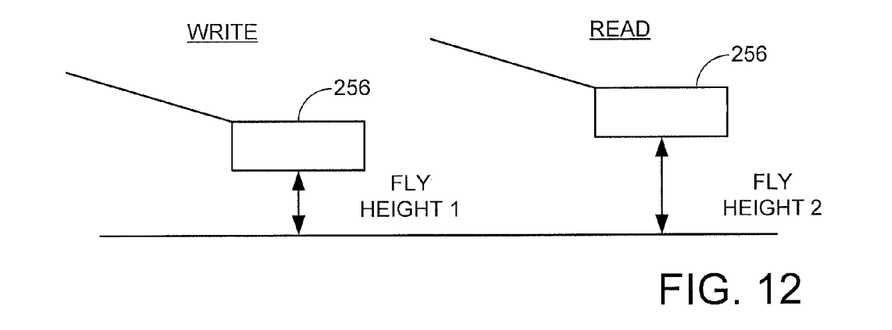
FIG. 12 depicts different fly heights of the transducer used during the sequence of FIG. 9 in some embodiments.

In this way, as shown in FIG. 12 a first lower fly height (fly height 1) for a transducer 256 can be used during the writing of the single pattern and a second, higher fly height (fly height 2) can be used for the transducer 256 during the subsequent reading of the patterns. Other parametric adjustments can be implemented as desired. It will be noted that parametric adjustments such as set forth in FIGS. 11-12 can be implemented during the multi-write media defect scheme of FIG. 6 and FIG. 9 as required.

Figure 13:
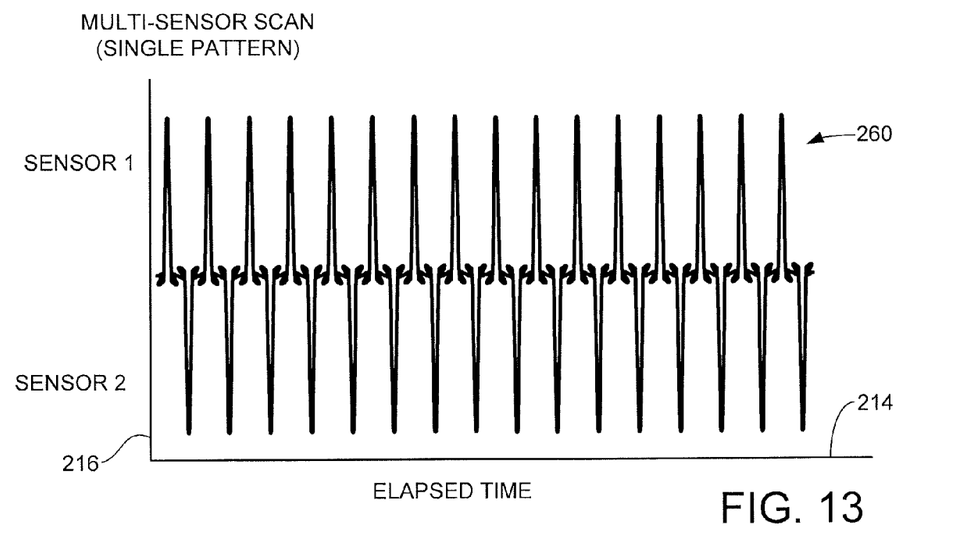
FIG. 13 is a graphical representation of readback signals nominally obtained during the sequence of FIG. 9 in which a single repeating pattern is concurrently sensed from adjacent tracks.

FIG. 13 is a graphical representation of another readback response curve 260 in accordance with some embodiments. The curve 260 generally depicts the actual response that would be obtained from of a single, centered 2T repeating pattern written in accordance with FIG. 8, and not necessarily what is recovered by the sensors as aligned in FIG. 8. Rather, the portions of the written pattern by the respective read sensors 236, 238 (sensor 1 and 2) will be sensed as generally depicted in FIG. 7 except that the sensed patterns will be nominally 180 degrees out of phase. It has been found that sensors aligned as in FIG. 8 can differentiate separate sides of the same patterns as individual first and second repeating patterns, allowing the detection of defects as discussed above.

The preceding media defect scan sequences can be used in a variety of ways. In some embodiments, some tracks on a given media are scanned in accordance with the separate writing sequence of FIG. 6 and other tracks are scanned using the combined writing sequence of FIG. 9. In other embodiments, the sequence of FIG. 9 is employed first, and those areas exhibiting potential problems are individually written and evaluated using FIG. 6. Parametric adjustments can further be used to refine the locations and characterizations of particular defects.

Figure 14:
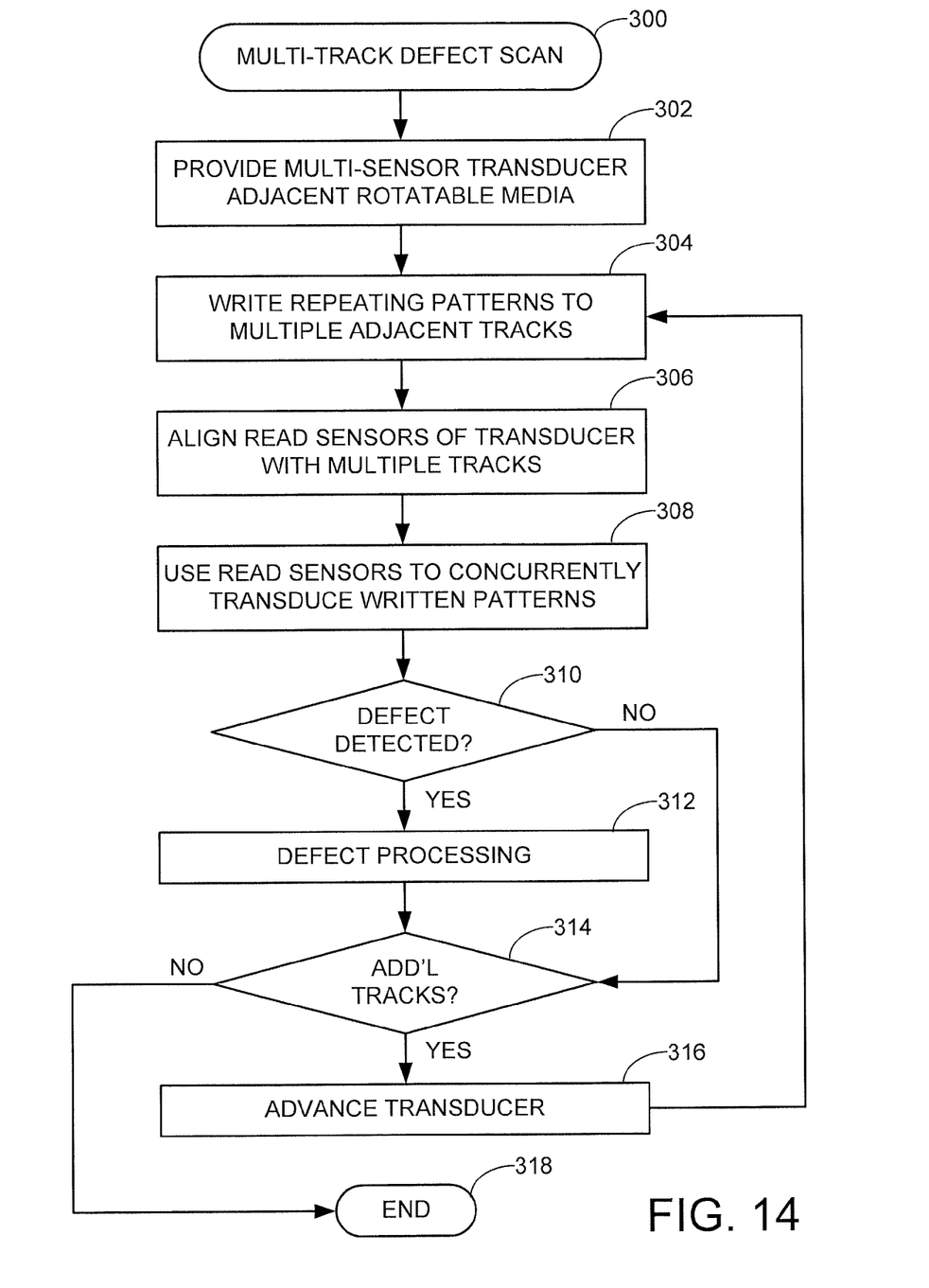
FIG. 14 is a flow chart for a multi-track defect scan routine carried out in accordance with various embodiments of the present disclosure.

FIG. 14 is a flow chart for a multi-track defect scan routine 300 carried out in accordance with the foregoing discussion. While the routine is not so limited, the present discussion will contemplate multi-track scans such as discussed above in FIGS. 6 and 9. The various steps can be modified, omitted, performed in a different order, etc.

The routine commences at step 302 by providing a multi-sensor transducer adjacent a rotatable data recording media. In some cases, this may occur during manufacturing once a device is fully assembled and subjected to qualification testing. It will be noted that the various techniques disclosed herein are particularly suitable for use early in the manufacturing process, including at a media level qualification prior to installation of the media into a storage device housing.

Repeating patterns are written to multiple adjacent tracks at step 304. This may be accomplished using a write element that writes a separate pattern to each track as in FIG. 6, or which writes a single pattern that extends across multiple tracks. While the various embodiments discussed above have, for purposes of simplicity, been limited to two adjacent tracks, it will be appreciated that the sequences can be extended to any plural numbers of adjacent tracks.

The read sensors of the transducer are next aligned with multiple tracks on the media at step 306, and the read sensors are used to concurrently transduce at least a first repeating pattern from a first track and a second repeating pattern from an adjacent track, step 308.

Decision step 310 indicates the detection of one or more defects, which are processed at step 312 as discussed above. In some cases, the location of hard defects may result in one or more entries in a defect map structure such as discussed above in FIG. 2.

As shown by steps 314 and 316, additional pairs of tracks are stepwise written and read as required so that the foregoing sequence is repeated until the entirety of the desired recording surface area has been evaluated, after which the process ends at step 318. It will be appreciated that all of the desired surface area or portions, such as recording zones, may be initially written with suitable repeating patterns, after which the read sensors are used to concurrently evaluate the written tracks. Moreover, it will be appreciated that the spacing of the read sensors and their relative positions may make dual-sensor defect scanning not feasible for some ranges of tracks. For these track ranges, the drive may use a fewer number of sensors (e.g., a single sensor) for defect scanning.

While repeating patterns (e.g., 2T) patterns have been illustrated in various embodiments, it will be appreciated that any number of patterns, including patterns corresponding to user data supplied by a host device, can be used during the defect scanning operations.

The various structural configurations of the sensors, write elements, heaters and other elements described in the present disclosure allow for two dimensional magnetic reading or single track reading as required, including at different times using the same media. The reader sections are adapted for any number of different environments including shingled (partially overlapping) tracks. Different tracks can be written with different encoding schemes (RLL, EDC, etc.) to account for different readback responses of the respective sensors. While the embodiments have been directed to magnetic sensing, it will be appreciated that the disclosed subject matter can readily be utilized in any number of other applications.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A method comprising:
   writing a first pattern to a first track on a rotatable storage media and a second pattern to a second track on the media using a write element positioned at a first clearance distance with respect to the rotatable storage media;
   concurrently using a first read sensor of a multi-sensor transducer to sense the first pattern from the first track and a second read sensor of the multi-sensor transducer to sense the second pattern from the second track at a second clearance distance different from the first clearance distance; and
   detecting at least one storage media defect responsive to the sensed first and second patterns.

2. The method of claim 1, wherein the multi-sensor transducer comprises a write element adjacent the first and second read sensors used to write the first and second patterns to the respective first and second tracks.

3. The method of claim 2, wherein the writing step comprises using the write element to write the first pattern to the first track during a first revolution of the storage media, and using the write element to write the second pattern to the second track during a subsequent revolution of the storage media.

4. The method of claim 2, wherein the writing step comprises positioning the write element at a midpoint between the first and second tracks and writing a single pattern that extends across the first and second tracks, wherein the first pattern comprises a first portion of the single pattern written by the write element at said midpoint between the first and second tracks and the second pattern comprises a different, second portion of the single pattern written by the write element at said midpoint between the first and second tracks.

5. The method of claim 1, wherein the multi-sensor transducer is positioned at a first fly height adjacent the storage media during the writing step, and wherein the multi-sensor transducer is positioned at a greater, second fly height adjacent the storage media during the concurrently using step.

6. The method of claim 1, further comprising generating a defect map to identify at least one defective sector on the storage media responsive to the detected at least one defect.

7. The method of claim 1, wherein the first and second patterns are each characterized as a repeating pattern.

8. The method of claim 1, wherein the first and second patterns are each written at the same nominally frequency.

9. The method of claim 8, wherein the first and second patterns are stitched together so as to be phase coherent across the first and second tracks.

10. The method of claim 1, wherein the first pattern is written at a first frequency, and the second pattern is written at a different second frequency.

11. The method of claim 1, further comprising using a write element to write the first and second patterns, wherein the method further comprises subsequently using the write element to write user data to the first and second tracks at a first power level, wherein the write element writes the first and second patterns at a higher, second power level.

12. The method of claim 11, wherein the first power level comprises a first write current magnitude applied to a write coil of the write element and the second power level comprises a higher second write current magnitude applied to the write coil.

13. The method of claim 11, wherein the first power level comprises a first laser power applied by a heat assisted magnetic recording (HAMR) module of the write element and the second power level comprises a higher second laser power applied by the HAMR module.

14. A method comprising:
   providing a multi-sensor transducer adjacent a rotatable storage media, the multi-sensor transducer comprising a write element and a plurality of read sensors;
   using the write element to write a first pattern to a first track on the media and a second pattern to a second track on the media;
   concurrently using a first read sensor of the plurality of read sensors to sense the first pattern from the first track and a second read sensor of the plurality of read sensors to sense the second pattern from the second track;
   identifying at least one storage media defect responsive to the sensed first and second patterns; and
   using the write element to write user data to the first and second tracks at a first power level, the write element writing the first and second patterns at a higher, second power level.

15. The method of claim 14, wherein the first power level comprises a first write current magnitude applied to a write coil of the write element and the second power level comprises a higher second write current magnitude applied to the write coil.

16. The method of claim 14, wherein the first power level comprises a first laser power applied by a heat assisted magnetic recording (HAMR) module of the write element and the second power level comprises a higher second laser power applied by the HAMR module.

17. An apparatus comprising:
   a multi-sensor transducer supported adjacent a rotatable storage media, the transducer comprising at least one write element and at least first and second read sensors;
   a media defect manager configured to identify defects on the media by directing the at least one write element to write a first pattern to a first track on the media and a second pattern to a second track on the media, and to direct the first and second read sensors to concurrently sense the respective first and second patterns; and
   a fly height adjustment (FHA) mechanism directed by the media defect manager to establish a first clearance distance between the transducer and the storage media during the writing of the first and second patterns, and to establish a second, greater clearance distance between the transducer and the storage media during the concurrent sensing of the respective first and second patterns, the first and second patterns are written b placing the write element adjacent a midpoint of the first and second tracks and writing a single pattern so that the first pattern comprises a first portion of the single pattern and the second pattern comprises a different second portion of the single pattern.

18. The apparatus of claim 17, wherein the first pattern is written during a first revolution of the media and the second pattern is written during a subsequent second revolution of the medium.

19. The apparatus of claim 17, wherein the first and second patterns are concurrently written during a single revolution of the medium.

20. The apparatus of claim 17, wherein the storage medium is a rotatable magnetic recording medium.

* * * * *